United States Patent
Sawamura

(10) Patent No.: US 9,614,983 B2
(45) Date of Patent: Apr. 4, 2017

(54) INFORMATION PROCESSING APPARATUS, INFORMATION PROCESSING METHOD, AND COMPUTER PROGRAM PRODUCT

(71) Applicant: Megumi Sawamura, Tokyo (JP)

(72) Inventor: Megumi Sawamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/281,005

(22) Filed: May 19, 2014

(65) Prior Publication Data

US 2014/0351817 A1    Nov. 27, 2014

(30) Foreign Application Priority Data

May 23, 2013  (JP) ................... 2013-108660

(51) Int. Cl.
- *H04N 1/00* (2006.01)
- *G06Q 10/10* (2012.01)
- *G06F 9/44* (2006.01)

(52) U.S. Cl.
CPC ..... *H04N 1/00209* (2013.01); *H04N 1/00127* (2013.01); *H04N 1/00244* (2013.01); *G06F 8/34* (2013.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 6,003,011 A | * | 12/1999 | Sarin | G06Q 10/04 705/7.12 |
| 6,980,332 B2 | * | 12/2005 | Simske | 358/445 |
| 7,522,175 B2 | * | 4/2009 | Morita et al. | 345/619 |
| 7,778,717 B2 | * | 8/2010 | Bachman et al. | 700/83 |
| 7,934,165 B2 | * | 4/2011 | Corona | 715/769 |
| 8,027,861 B2 | * | 9/2011 | Brintle | G06Q 10/06 705/7.13 |
| 8,738,415 B2 | * | 5/2014 | Sangroniz et al. | 705/7.27 |
| 8,806,346 B2 | * | 8/2014 | Hedges | 715/738 |

(Continued)

FOREIGN PATENT DOCUMENTS

| | | |
|---|---|---|
| JP | 2008-204178 | 9/2008 |
| JP | 2009-146092 | 7/2009 |

(Continued)

*Primary Examiner* — Matthew Brophy
(74) *Attorney, Agent, or Firm* — Harness, Dickey & Pierce, P.L.C.

(57) ABSTRACT

An information processing apparatus has one or more programs to execute a workflow and receives an execution request for the workflow. The information processing apparatus includes a workflow storage unit to store therein one or more workflow definitions each defining a workflow including an execution sequence of one or more processes each executed by any of the one or more programs; a selecting unit to receive a selection of a workflow to be executed based on the workflow definitions stored in the workflow storage unit; an editing unit to edit the selected workflow to be executed in response to a user operation to edit the selected workflow; and a workflow controller to execute, in response to reception of an execution request for the edited workflow to be executed, the edited workflow by any of the one or more programs corresponding to a process included in the edited workflow.

16 Claims, 10 Drawing Sheets

(56) References Cited

U.S. PATENT DOCUMENTS

| | | | |
|---|---|---|---|
| 2002/0075293 A1* | 6/2002 | Charisius et al. | 345/704 |
| 2002/0188597 A1* | 12/2002 | Kern | G06Q 10/06 |
| 2006/0044612 A1* | 3/2006 | Kayama | 358/1.15 |
| 2006/0143591 A1* | 6/2006 | Hilerio et al. | 717/101 |
| 2006/0197977 A1* | 9/2006 | Miyata | 358/1.15 |
| 2007/0136117 A1* | 6/2007 | Matsueda | 705/7 |
| 2007/0282658 A1* | 12/2007 | Brintle | G06Q 10/06 |
| | | | 705/7.15 |
| 2008/0170254 A1* | 7/2008 | Shah | 358/1.15 |
| 2009/0012800 A1* | 1/2009 | Devarakonda et al. | 705/1 |
| 2009/0158281 A1 | 6/2009 | Omori | |
| 2010/0050153 A1* | 2/2010 | Louie et al. | 717/111 |
| 2010/0251155 A1* | 9/2010 | Shah et al. | 715/771 |
| 2011/0176166 A1 | 7/2011 | Sawamura | |
| 2011/0184870 A1* | 7/2011 | Angel et al. | 705/301 |
| 2012/0229848 A1 | 9/2012 | Sawamura | |
| 2013/0179208 A1* | 7/2013 | Chung et al. | 705/7.15 |
| 2014/0282899 A1* | 9/2014 | Baldwin | G06F 21/62 |
| | | | 726/4 |

FOREIGN PATENT DOCUMENTS

| | | |
|---|---|---|
| JP | 2010-166174 | 7/2010 |
| JP | 2010-213247 | 9/2010 |
| JP | 2011-107959 | 6/2011 |
| JP | 2011-151492 | 8/2011 |
| JP | 2012-065006 | 3/2012 |
| JP | 2012-190205 | 10/2012 |
| JP | 2014175978 A | 9/2014 |
| JP | 2014232946 A | 12/2014 |

\* cited by examiner

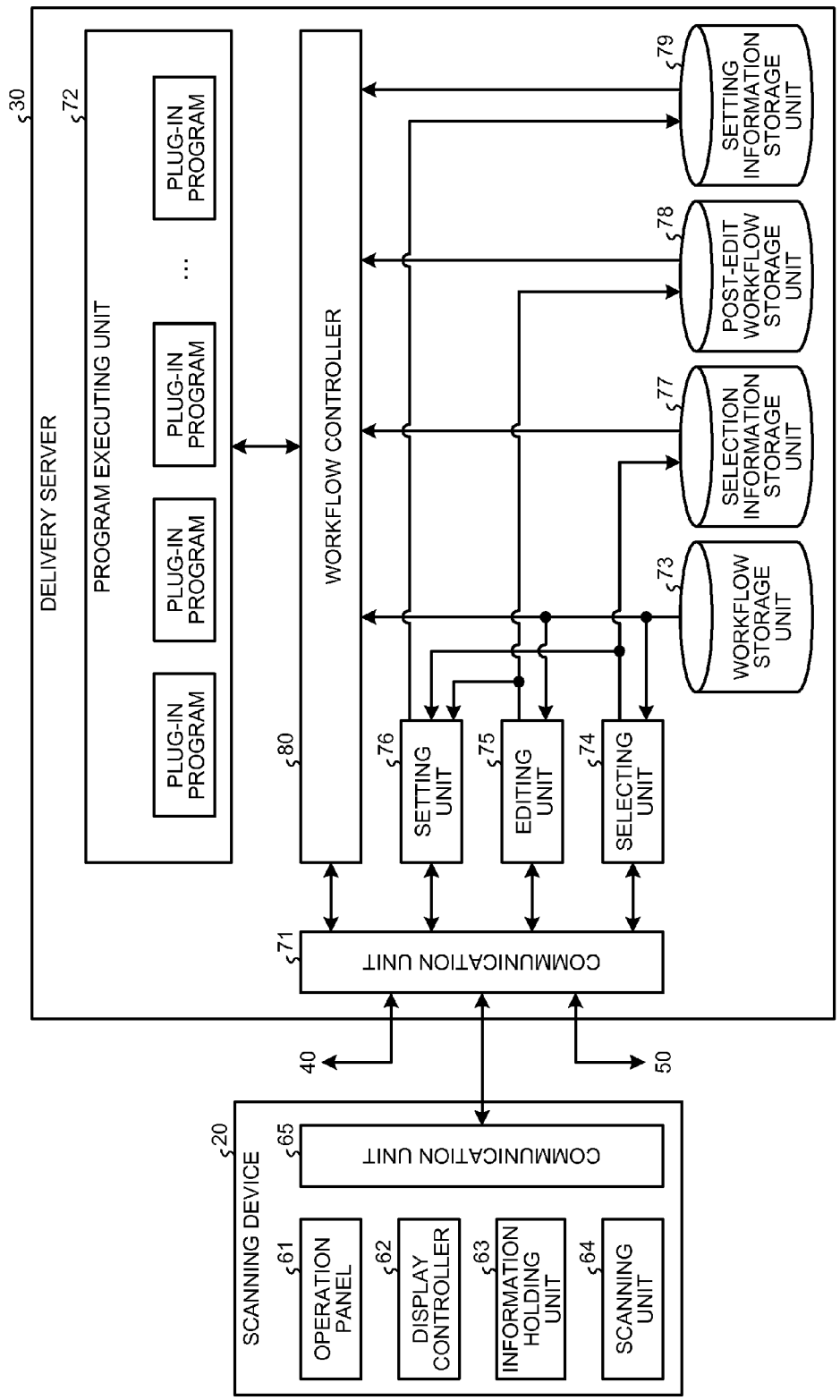

FIG.3

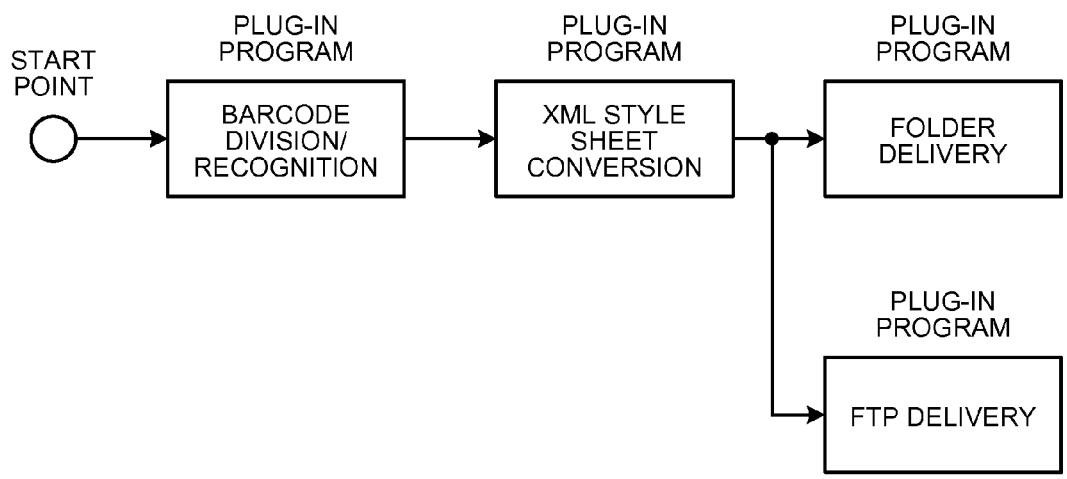

FIG.4

```
<flow>
  <plugin id="ToFolder" type="output" displayName="FOLDER DELIVERY" />
  <plugin id="ToFTPServer" type="output" displayName="FTP DELIVERY" />
  <plugin id="XmlTranscoder" type="filter" displayName="XML STYLE SHEET CONVERSION">
    <nextPlugin id="ToFolder"/>
  </plugin>
  <plugin id="Barcode" type="filter" displayName="BARCODE DIVISION/RECOGNITION">
    <nextPlugin id="XmlTranscoder"/>
    <nextPlugin id="ToFTPServer"/>
  </plugin>
  <startpoint>
    <nextPlugin id="Barcode"/>
  </startpoint>
</flow>
```

| PLUG-IN PROGRAM | a | b | c | d | e |
|---|---|---|---|---|---|
| | 1 | 1 | 1 | 0 | 1 |

| WORKFLOW \ PLUG-IN PROGRAM | a | b | c | d | e |
|---|---|---|---|---|---|
| A | 1 | 1 | 1 | 1 | 1 |
| B | 1 | 1 | 1 | 1 | 1 |
| C | 1 | 1 | 1 | 0 | 0 |
| D | 1 | 1 | 1 | 0 | 1 |
| E | 1 | 1 | 1 | 1 | 1 |

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2013-108660 filed in Japan on May 23, 2013.

BACKGROUND OF THE INVENTION

1. Field of the Invention

The present invention relates to an information processing apparatus, an information processing method, and a computer program product.

2. Description of the Related Art

Conventionally, a scanner has a function, by defining in advance a sequence of a plurality of processes as a workflow, to execute the processes defined by the workflow on image data captured (for example, see Japanese Patent Application Laid-open No. 2009-146092). Defining a workflow enables the scanner to transmit the image data captured to a specified folder in a server automatically or to send it via mail automatically. In such a process, there may be a case in which image correction and character recognition are performed on the image data captured.

As in the foregoing, defining a workflow enables the scanner, when paper documents used in an office and others are computerized, to execute routine processes corresponding to the paper documents accurately and easily.

When a peripheral server or the like is updated or a new program is provided, for example, there may be a case in which a new process is available to add to a workflow. For example, as a new server is installed, a process to deliver scanned data to the new server may become available to add to a workflow. In such case, an administrator examines the content of an existing workflow, and updates the existing workflow or creates a new workflow, thereby enabling a user to select and execute the newly defined workflow.

However, when a great number of paper documents or operations are generated in the office and others, the number of workflows to be registered is also numerous. Consequently, for the user to execute a workflow that uses a newly added process, the user needs to wait until the administrator updates the existing workflow or creates a new workflow, and this may pose a problem in the operation of the user. Such a problem is not limited to the workflow executed on the image data captured by the scanner, and can arise in a use form in which a computer program or a device that is addable is used to execute a workflow.

Therefore, there is a need for a an information processing apparatus and an information processing method that enable efficient management of a workflow definition in which an execution sequence of processes is defined.

SUMMARY OF THE INVENTION

According to an embodiment, an information processing apparatus has one or more programs to execute a workflow and receives an execution request for the workflow. The information processing apparatus includes a workflow storage unit to store therein one or more workflow definitions each defining a workflow including an execution sequence of one or more processes each executed by any of the one or more programs; a selecting unit to receive a selection of a workflow to be executed based on the workflow definitions stored in the workflow storage unit; an editing unit to edit the selected workflow to be executed in response to a user operation to edit the selected workflow; and a workflow controller to execute, in response to reception of an execution request for the edited workflow to be executed, the edited workflow by any of the one or more programs corresponding to a process included in the edited workflow.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram illustrating the configuration of a scanning device 20 and a delivery server 30 in the embodiment;

FIG. 3 is a diagram illustrating one example of a workflow definition;

FIG. 4 is a diagram illustrating an example of a workflow definition described in XML;

DETAILED DESCRIPTION OF THE PREFERRED EMBODIMENTS

The following describes an embodiment in detail with reference to the accompanying drawings. The invention, however, is not limited to the embodiment.

Figure 1:
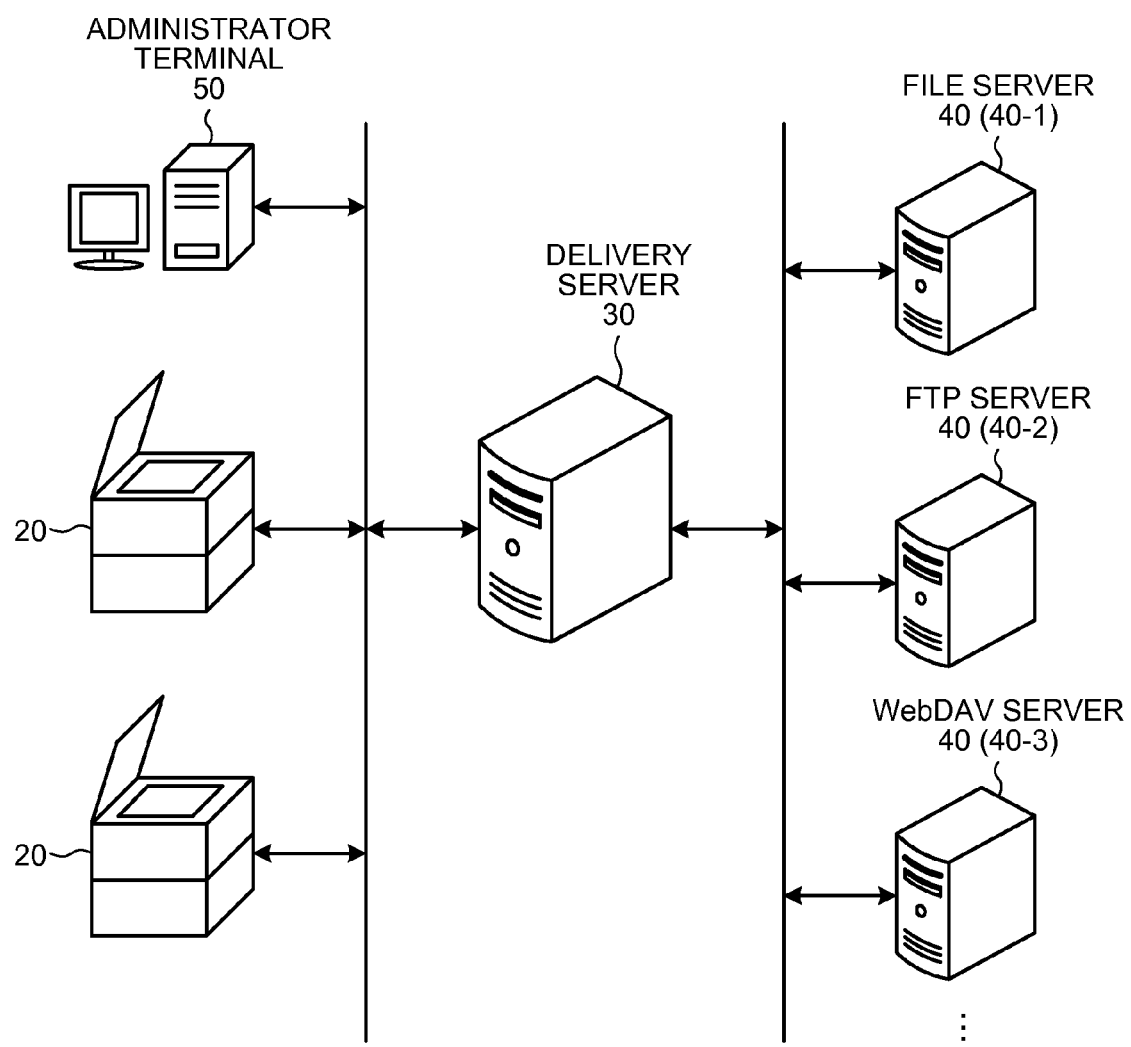
FIG. 1 is a diagram illustrating the configuration of a delivery system 10 according to an embodiment of the present invention.

FIG. 1 is a diagram illustrating the configuration of a delivery system 10 according to the embodiment. The delivery system 10 includes one or more scanning devices 20, a delivery server 30, one or more data storage devices 40 (40-1, 40-2, 40-3), and an administrator terminal 50.

The delivery server 30, each of the scanning devices 20, and the administrator terminal 50 are connected to one another via a network. The delivery server 30 and each of the data storage devices 40 are connected to one another via a network.

The scanning device 20 is one example of an image-capturing device, and scans paper or the like to generate image data. The scanning device 20 may be a multifunction peripheral that has at least one of a facsimile function, a copying function, and a print function, together with the scanner function. The scanning device 20 transmits the image data generated to the delivery server 30 via the network.

The delivery server 30 is composed of one or more information processing apparatuses. The delivery server 30 acquires image data from each of the scanning devices 20.

The delivery server 30 executes, in a predetermined order, one or more processes on the image data acquired from the scanning device 20. The delivery server 30 executes a filtering process (image correction, file format conversion, character recognition, barcode reading, document information extraction, and others) on the image data acquired from the scanning device 20, as one example. The delivery server 30 then transmits the image data acquired from the scanning device 20 as well as the various document information generated by the filtering process to the predetermined data storage device 40 to store them in the data storage device 40.

Each of the data storage devices 40 is a device that stores therein image data. The data storage devices 40 include a file server 40-1 that manages shared folders of Windows (registered trademark), a file transfer protocol (FTP) server 40-2, and a web-based distributed authoring and versioning (WebDAV) server 40-3, as one example. The data storage devices 40 may be SharePoint servers or e-mail transmission servers, as one example.

The administrator terminal 50 is a computer operated by an administrator of the delivery system 10. The administrator terminal 50 performs various settings on the delivery server 30 via the network.

The delivery server 30 stores therein in advance plug-in programs (processing programs) that cause a computer to execute processes on the image data captured by the scanning device 20. The delivery server 30 executes the plug-in program to execute a corresponding filtering process and a data transmission process.

For example, the delivery server 30 stores therein in advance a plug-in program to execute image correction, a plug-in program to execute file format conversion, a plug-in program to transmit data to the file server 40-1, a plug-in program to transmit data to the FTP server 40-2, and others. The delivery server 30 then executes the respective plug-in programs to execute the image correction, the file format conversion, the data transmission to the file server 40-1, and the data transmission to the FTP server 40-2.

The delivery server 30 further stores therein in advance one or more workflow definitions each defining an execution sequence of one or more processes each executed by the at least one of the plug-in programs. The delivery server 30 stores therein a plurality of workflow definitions, as one example.

The delivery server 30 provides a screen to select a workflow definition to the scanning device 20 prior to a scanning process so as to prompt the user to select any of the workflow definitions. The delivery server 30 acquires, when the scanning device 20 executes the scanning process after the user selected a workflow definition, the image data captured by the scanning device 20 via the network. The delivery server 30 executes the plug-in programs in accordance with the workflow definition when the image data from the scanning device 20 is acquired. Consequently, the delivery server 30 can execute predetermined processes on the image data captured by the scanning device 20 in a predetermined order.

The delivery server 30 may be incorporated in the scanning device 20 in an integrated manner. The delivery system 10 may include an imaging apparatus or a facsimile, for example, as the image-capturing device in place of or in addition to the scanning device 20. The data storage device 40 may be a device directly connected to the delivery server 30, or may be a device configured with the delivery server 30 in an integrated manner.

FIG. 2 is a block diagram illustrating the configuration of the scanning device 20 and the delivery server 30 in the embodiment. The scanning device 20 includes an operation panel 61, a display controller 62, an information holding unit 63, a scanning unit 64, and a communication unit 65.

The operation panel 61 displays a screen for the user and receives operation input from the user via operation buttons and a text input box. The operation panel 61 includes a touch panel and various operation buttons, as one example.

The display controller 62 controls the operation panel 61. The information holding unit 63 stores therein images to be displayed on the operation panel 61 and the information entered on the operation panel 61. The scanning unit 64 scans paper and the like set on a platen to generate image data.

The communication unit 65 performs communication with the delivery server 30 via the network. The communication unit 65 acquires information to display on the operation panel 61 from the delivery server 30, and transmits the information entered on the operation panel 61 to the delivery server 30, as one example. The communication unit 65 further transmits the image data captured by the scanning unit 64 to the delivery server 30, as one example.

The delivery server 30 includes a communication unit 71, a program executing unit 72, a workflow storage unit 73, a selecting unit 74, an editing unit 75, a setting unit 76, a selection information storage unit 77, a post-edit workflow storage unit 78, a setting information storage unit 79, and a workflow controller 80.

The communication unit 71 performs communication with the scanning devices 20, the data storage devices 40, and the administrator terminal 50 via the network.

The program executing unit 72 executes a plurality of plug-in programs registered in advance in accordance with the control of the workflow controller 80.

The workflow storage unit 73 stores therein one or more workflow definitions. While each of the workflow definitions is assumed to be set (updated or added) by accessing the delivery server 30 from the administrator terminal 50 of the administrator with the administrative rights having an authority to define workflows, it is not limited to this. At least when the user uses the scanning device 20 to execute a workflow, the user selects a desired workflow out of the workflow definitions stored therein already.

The selecting unit 74, prior to capturing image data by the scanning device 20, receives a selection of any one of the workflow definitions (a selection of a workflow to be executed) out of the workflow definitions in response to the user operation made on the scanning device 20. The selecting unit 74, via the communication unit 71, causes the operation panel 61 of the scanning device 20 to display a screen to select a workflow definition, and receives the selection of workflow definition in response to the user operation made on the selection screen, as one example. The selecting unit 74 then causes the selection information storage unit 77 to store therein the content of the selection received.

The editing unit 75, prior to capturing the image data by the scanning device 20, edits the selected workflow definition in response to the user operation made on the scanning device 20. The editing unit 75, via the communication unit 71, causes the operation panel 61 of the scanning device 20 to display a screen to edit the selected workflow definition, and receives the user operation to edit the workflow definition made on the edit screen, as one example. The editing unit 75 edits the workflow definition stored in the workflow storage unit 73 in response to the user operation received, as one example. The editing unit 75 then causes the post-edit workflow storage unit 78 to store therein the edited workflow definition.

The setting unit 76 receives setting information necessary to process the respective plug-in programs to be executed in accordance with the workflow definition selected or the workflow definition edited. The setting unit 76, via the communication unit 71, causes the operation panel 61 of the scanning device 20 to display an entry screen for setting information, and receives the setting information entered on the entry screen, as one example. The setting unit 76 then causes the setting information storage unit 79 to store therein the setting information received.

The selection information storage unit 77 stores therein the selection information selected by the selecting unit 74. The post-edit workflow storage unit 78 stores therein the workflow definition edited by the editing unit 75. The setting information storage unit 79 stores therein the setting information received by the setting unit 76.

When image data is captured by the scanning device 20 and the communication unit 71 receives the image data captured by the scanning device 20, the workflow controller 80 refers to the selection information stored in the selection information storage unit 77 and reads out the workflow definition selected by the user from the workflow storage unit 73. When the workflow definition is edited by the editing unit 75, the workflow controller 80 reads out the edited workflow definition from the post-edit workflow storage unit 78.

The workflow controller 80 then causes the program executing unit 72 to execute at least one of the plug-in programs in accordance with the workflow definition read out or with the workflow definition edited. In this case, the workflow controller 80 reads out the appropriate setting information from the setting information storage unit 79 and transfers it to the plug-in program when the respective plug-in programs are executed.

FIG. 3 is a diagram illustrating one example of a workflow definition. When the scanning device 20 performs a scanning process, the delivery server 30 executes the plug-in programs in accordance with the workflow definition illustrated in FIG. 3, for example.

When the delivery server 30 receives the image data captured by the scanning device 20, the delivery server 30 first executes a plug-in program that divides and recognizes barcode as the first process, for example. The barcode division/recognition process is a process to extract a barcode located at a given position within the image data from the image data and to acquire the content of the barcode.

Next, as the second process, the delivery server 30 executes a plug-in program that performs extensible markup language (XML) style sheet conversion, for example. The XML style sheet conversion is a process to convert the bibliographical information of image data to the data in XML format.

Subsequently, as the third process, the delivery server 30 executes a plug-in program that performs folder delivery, for example. The folder delivery is a process to transmit image data to a shared folder of the file server 40-1 on the network to store the image data in the shared folder. Furthermore, as the fourth process, the delivery server 30 executes a plug-in program that performs FTP delivery in parallel with the third process (folder delivery), for example. The FTP delivery is a process to transmit data to the FTP server 40-2 on the network via FTP to store the data in the FTP server 40-2.

FIG. 4 is a diagram illustrating an example of a workflow definition described in XML. In the delivery server 30, the system configuration is implemented by the computer executing a delivery program. The delivery program runs on a Java virtual machine (Java VM) implemented on an operating system, as one example.

In this case, the workflow definition is implemented by a document described in XML, as one example. For example, the workflow definition illustrated in FIG. 3 is implemented by the codes as illustrated in FIG. 4, as one example.

Figure 5:
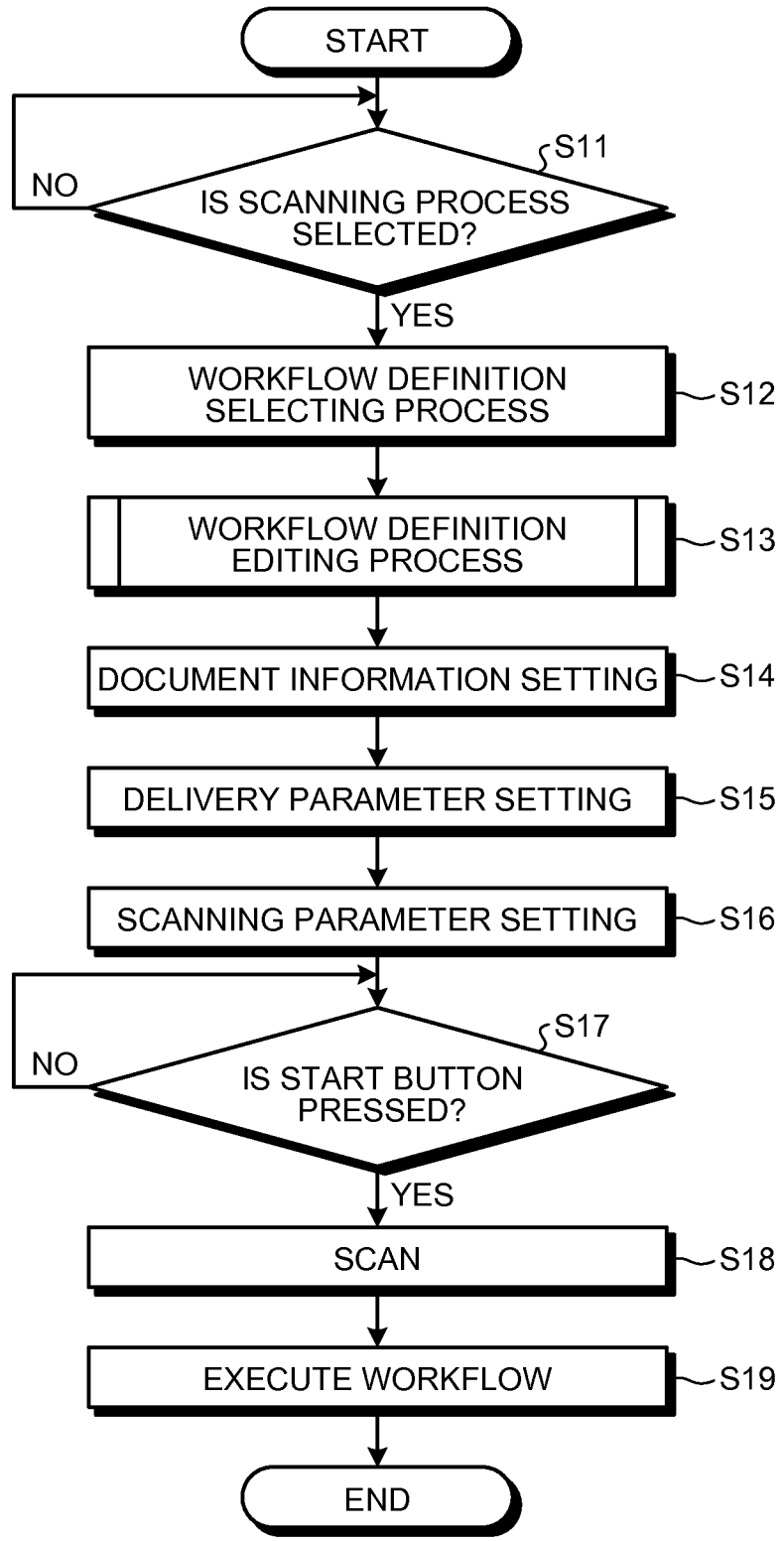
FIG. 5 is a flowchart illustrating a sequence of processes performed by the scanning device 20 and the delivery server 30.

FIG. 5 is a flowchart illustrating a sequence of processes performed by the scanning device 20 and the delivery server 30. First, at Step S11, the delivery server 30 waits until the user sets a sheet of paper on the platen of the scanning device 20 and selects specific application software (application software to access the delivery server 30 and execute a workflow) (until the user presses an icon button for the specific application software, for example). When the specific application software is selected (Yes at Step S11), the process of the delivery server 30 proceeds to Step S12.

Next, at Step S12, the delivery server 30 performs a process of selecting a workflow definition. Specifically, the delivery server 30 causes the operation panel 61 of the scanning device 20 to display a selection screen to prompt the user to select a workflow definition stored in the workflow storage unit 73, and receives the selection of workflow definition by the user. When the selection of workflow definition is completed, the process of the delivery server 30 proceeds to Step S13.

Then, at Step S13, the delivery server 30 displays an edit screen on the operation panel 61 of the scanning device 20, performs the process of editing the selected workflow definition in response to the user operation, and stores it in the post-edit workflow storage unit 78. When the process of editing the selected workflow definition is completed, the process of the delivery server 30 proceeds to Step S14.

At Step S13, there may be a case in which the selected workflow definition is not edited. The process at Step S13 will be described in detail with reference to FIG. 6 and the subsequent drawings.

Next, at Step S14, the delivery server 30 displays, on the operation panel 61 of the scanning device 20, an entry screen to receive a user input of document information necessary for executing the workflow based on the workflow definition selected or the workflow definition selected and edited, and sets the document information associated with the captured image data (the name of user created and a company name, for example) according to the user input. The items to be set at Step S14 may be preset by the administrator using the administrator terminal 50 or defined in advance in the plug-in program. At least a part of the document information may be input in advance or may be input dynamically by the scanning device 20 or the delivery server 30.

At Step S15, the delivery server 30 displays, on the operation panel 61 of the scanning device 20, an entry screen to receive a user input of delivery parameters necessary for executing the workflow based on the workflow definition selected or the workflow definition selected and edited, and sets the delivery parameters concerning the destination of the captured image data (a server name or a mail address of the destination, for example) according to the user input. The items to be set at Step S15 may be preset by the administrator using the administrator terminal 50 or defined in advance in the plug-in program. At least a part of the delivery parameters may be input in advance or may be input dynamically by the scanning device 20 or the delivery server 30.

Then, at Step S16, the delivery server 30 displays, on the operation panel 61 of the scanning device 20, an entry screen to receive a user input of scanning parameters necessary for executing the workflow based on the workflow definition selected or the workflow definition selected and edited, and sets the scanning parameters for the image data (document name, resolution, file format, OCR, or parameters for a correction process, for example) according to the user input. The items to be set at Step S16 may be preset by the administrator using the administrator terminal 50 or defined in advance in the plug-in program. At least a part of the scanning parameters may be input in advance or may be input dynamically by the scanning device 20 or the delivery server 30. As for the input of settings of the document information, the delivery parameters, and the scanning parameters, the order of input does not matter, and thus a single entry screen may be displayed and the user may input the foregoing in any order, for example.

Then, at Step S17, the scanning device 20 determines whether a start button on the operation panel 61 is pressed. When the start button is pressed (Yes at Step S17), the process of the scanning device 20 proceeds to Step S18.

At Step S18, the scanning device 20 scans a sheet of paper set on the platen to generate image data. The scanning device 20 then transmits the image data and an execution request for the workflow to the delivery server 30 via the network.

Next, at Step S19, the delivery server 30 that has received the execution request executes the plug-in programs in sequence on the image data captured by the scanning device 20 in accordance with the workflow definition selected (the workflow definition selected at Step S12) or the workflow definition edited (the workflow definition edited at Step S13) and the various types of setting information (the information set at Step S14 to Step S16) to execute the requested workflow. Consequently, the delivery server 30 can execute the predetermined filtering process on the image data captured by the scanning device 20, and transmit the image data and others to the predetermined data storage device 40 to store them in the data storage device 40.

Figure 6:
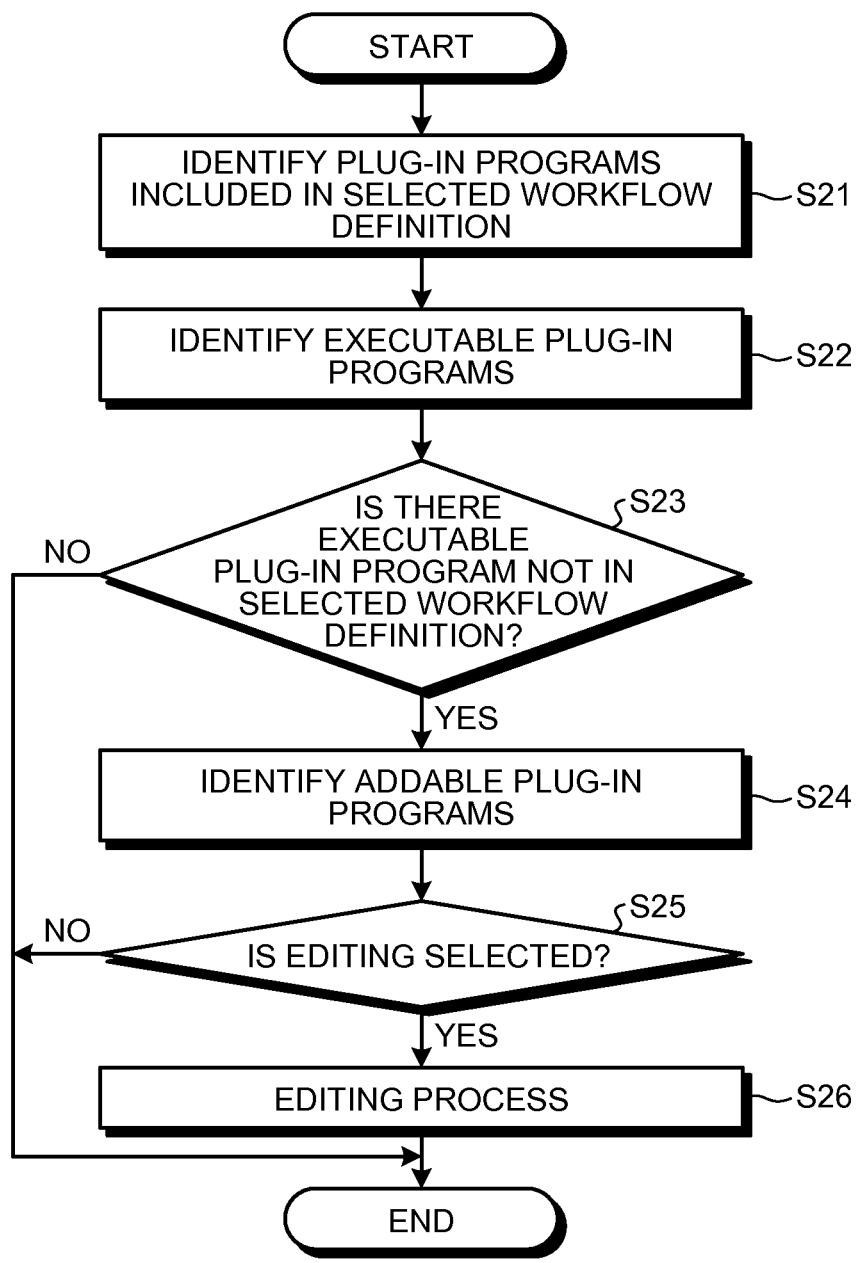
FIG. 6 is a flowchart illustrating the sequence of an editing process of a workflow definition in a first example.

FIG. 6 is a flowchart illustrating the sequence of an editing process of a workflow definition in a first example. The editing unit 75 of the delivery server 30 executes, at Step S13 in FIG. 5, the editing process illustrated in FIG. 6.

At Step S21, the editing unit 75 identifies the plug-in programs that are included in the selected workflow definition. The editing unit 75 analyzes the workflow definition described as an XML document to identify the plug-in programs included in the selected workflow definition, as one example.

Next, at Step S22, the editing unit 75 identifies all of the plug-in programs that are executable by the delivery server 30. The editing unit 75 identifies all of the plug-in programs that the delivery server 30 stores therein, as one example.

Then, at Step S23, the editing unit 75 determines whether there is any plug-in program that is not defined in the selected workflow definition out of the executable plug-in programs. If there is no executable plug-in program that is not defined in the selected workflow definition (No at S23), the editing unit 75 breaks away from the present sequence and ends the process without editing the selected workflow definition. If there is any executable plug-in program that is not included in the selected workflow definition (Yes at Step S23), the process of the editing unit 75 proceeds to Step S24.

At Step S24, the editing unit 75 identifies the executable plug-in program that is not included in the selected workflow definition as an addable plug-in program. Then, at Step S25, the editing unit 75 displays a screen to inquire the user whether to edit the selected workflow definition. If the user selects not to edit (No at Step S25), the editing unit 75 breaks away from the present sequence and ends the process without editing the selected workflow definition. If the user selects to edit (Yes at Step S25), the process of the editing unit 75 proceeds to Step S26. Alternatively, the editing unit 75 may omit the display of the inquiry screen at Step S25 and the process will proceed to Step S26.

At Step S26, the editing unit 75 causes the operation panel 61 of the scanning device 20 to display a screen to edit the selected workflow definition, and receives the editing operation for the workflow definition made on the edit screen. The editing unit 75 then edits the workflow definition stored in the workflow storage unit 73 in response to the user operation received.

For example, the editing unit 75 edits the workflow definition described as an XML document in response to the user operation. When the editing is completed, the editing unit 75 breaks away from the present sequence and ends the process.

Figure 7:
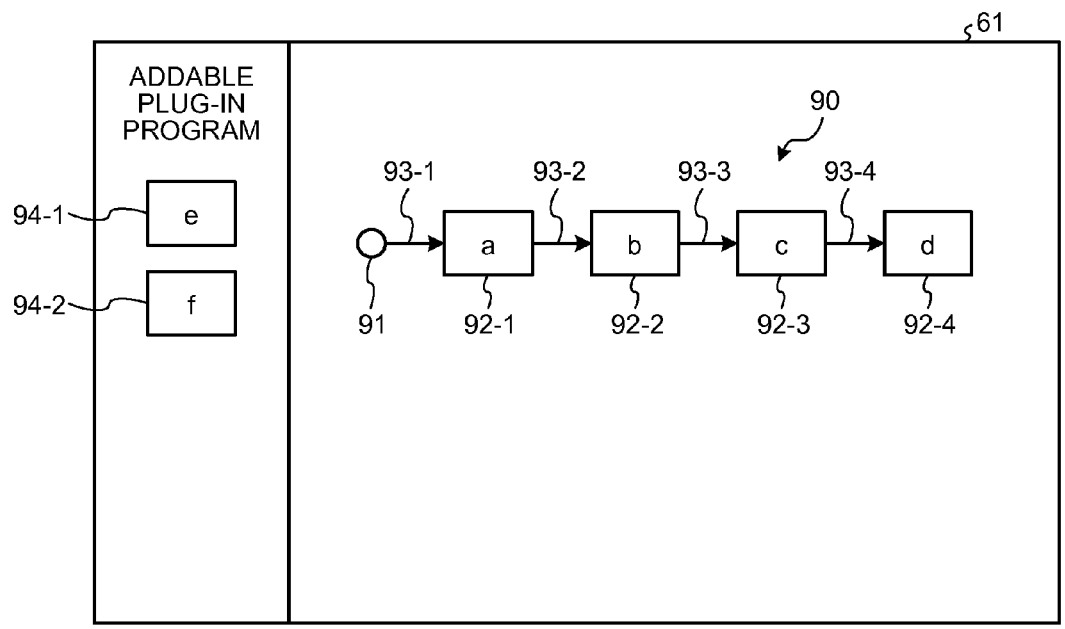
FIG. 7 is a diagram illustrating an example of an edit screen at a time when the editing of a workflow definition is started.

FIG. 7 is a diagram illustrating an example of the edit screen at a time when the editing of a workflow definition is started. The editing unit 75 displays the edit screen as illustrated in FIG. 7 on the operation panel 61 of the scanning device 20, as one example.

On the edit screen, displayed is a flowchart 90 representing the selected workflow definition. The flowchart 90 includes a start mark 91 representing the start, icons 92 (92-1 to 92-4) representing the plug-in programs "a" to "d" to be executed, and arrows 93 (93-1 to 93-4). The arrows 93 connect between the start mark 91 and each of icons 92 to represent the execution order of the plug-in programs.

On the edit screen, further displayed are icons 94 (94-1, 94-2) representing the addable plug-in programs "e" and "f" in a display area separate from the display area for the flowchart 90.

Figure 8:
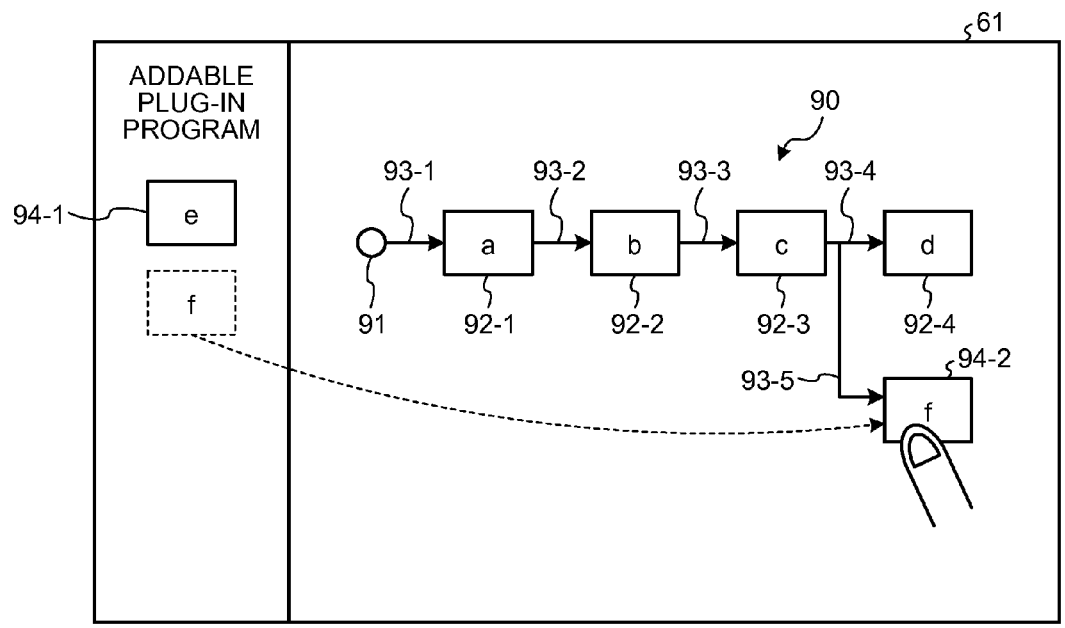
FIG. 8 is a diagram illustrating an example of the edit screen while the workflow definition is edited.

FIG. 8 is a diagram illustrating an example of the edit screen while the workflow definition is edited. In response to the user operation to add the icon 94-2 representing an addable plug-in program "f" to the flowchart 90 as illustrated in FIG. 8, the editing unit 75 adds a process executed by a new plug-in program "f" to the workflow definition. This enables the editing unit 75 to generate the workflow definition defining the processes corresponding to the new plug-in program.

The editing unit 75 may restrict, with respect to the workflow definition, to delete a plug-in program incorporated already from the workflow definition, or to alter the execution order of the plug-in programs incorporated already. Consequently, the editing unit 75 can restrict the workflow definition created by the administrator to be substantially altered by the user. More specifically, because the workflow definition can be assumed to be a workflow that the administrator has appropriately defined for each user to use, there may be cases in which the administrator permits to add a process by a new plug-in program to the workflow defined in such manner but not want to permit an edit to delete a process from the defined workflow. In such cases, it is useful that the editing unit 75 has a function to restrict the workflow definition to be edited in response to the user operation.

As a determination method to determine whether to permit the workflow definition to be edited, the determination method of determining whether there is any plug-in program that is not defined in the selected workflow definition out of the executable plug-in programs is one example. Alternatively, for example, the determination method may be a method of determining whether there is any process that is not defined in the selected workflow definition out of the processes executed by the executable plug-in programs. For example, there may be a plug-in program capable of performing a plurality of processes. In this case for example, when only one process out of the plurality of processes executed by such a plug-in program is defined in the workflow definition, the editing unit 75 can edit the workflow definition to change processes to be executed by such a plug-in program. At this time, the processes to be executed by such a plug-in program that can be edited (added, for example) out of the plug-in programs already defined in the workflow definition may be displayed in the flowchart 90 in FIG. 7 by changing the display colors to be distinguishable from the other plug-in programs, or may be displayed in another display area to be identifiable.

Figure 9:
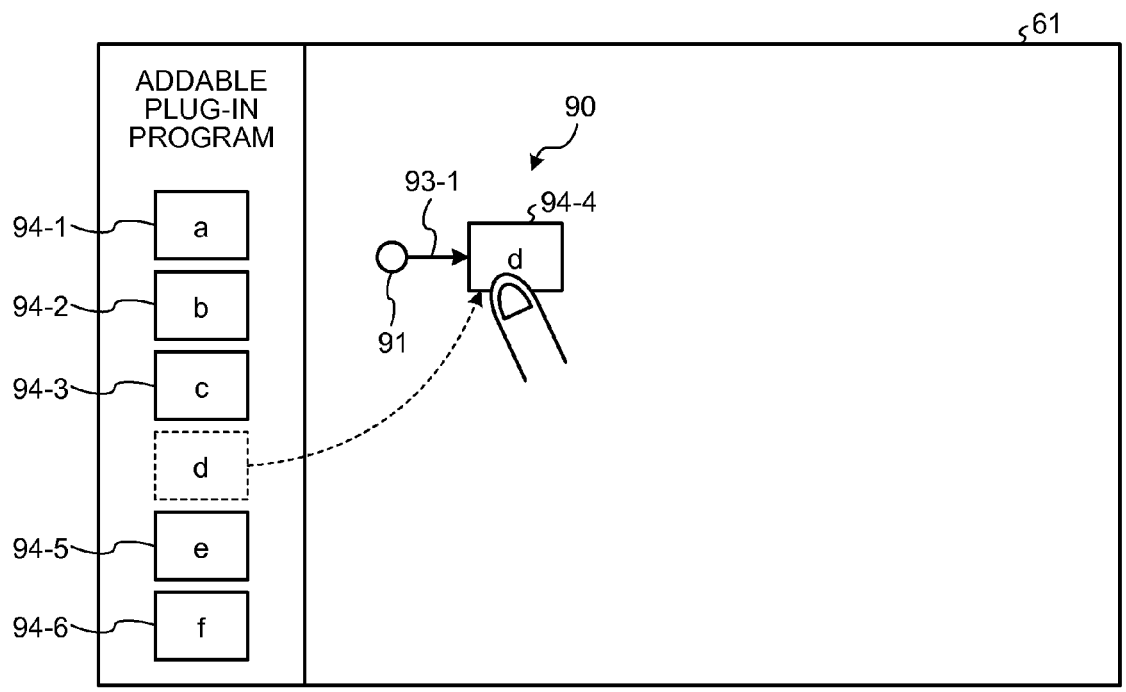
FIG. 9 is a diagram illustrating an example of the edit screen when a workflow definition is newly created.

FIG. 9 is a diagram illustrating an example of the edit screen when a workflow definition is newly created. When the selecting unit 74 prompts the user to select a workflow definition, the selecting module 74 may select an empty workflow definition not including any plug-in program to be executed For example, the selecting unit 74 displays a create-new button, and in response to the create-new button being pressed, selects an empty workflow definition.

In this case, on the edit screen, the flowchart 90 including only the start mark 91 is displayed first. On the edit screen, further displayed are the icons 94 (94-1 to 94-6) representing all of the plug-in programs executable by the delivery server 30 in the area different from the area for the flowchart 90. Then, the editing unit 75, in response to the user operation to add the icon 94-4 to the flowchart 90 including only the start mark 91, adds a new process executed by the plug-in program "e" corresponding to the icon 94-4 to the workflow definition.

Consequently, the editing unit 75 can newly create a workflow definition on the operation panel 61 of the scanning device 20.

Figure 10:
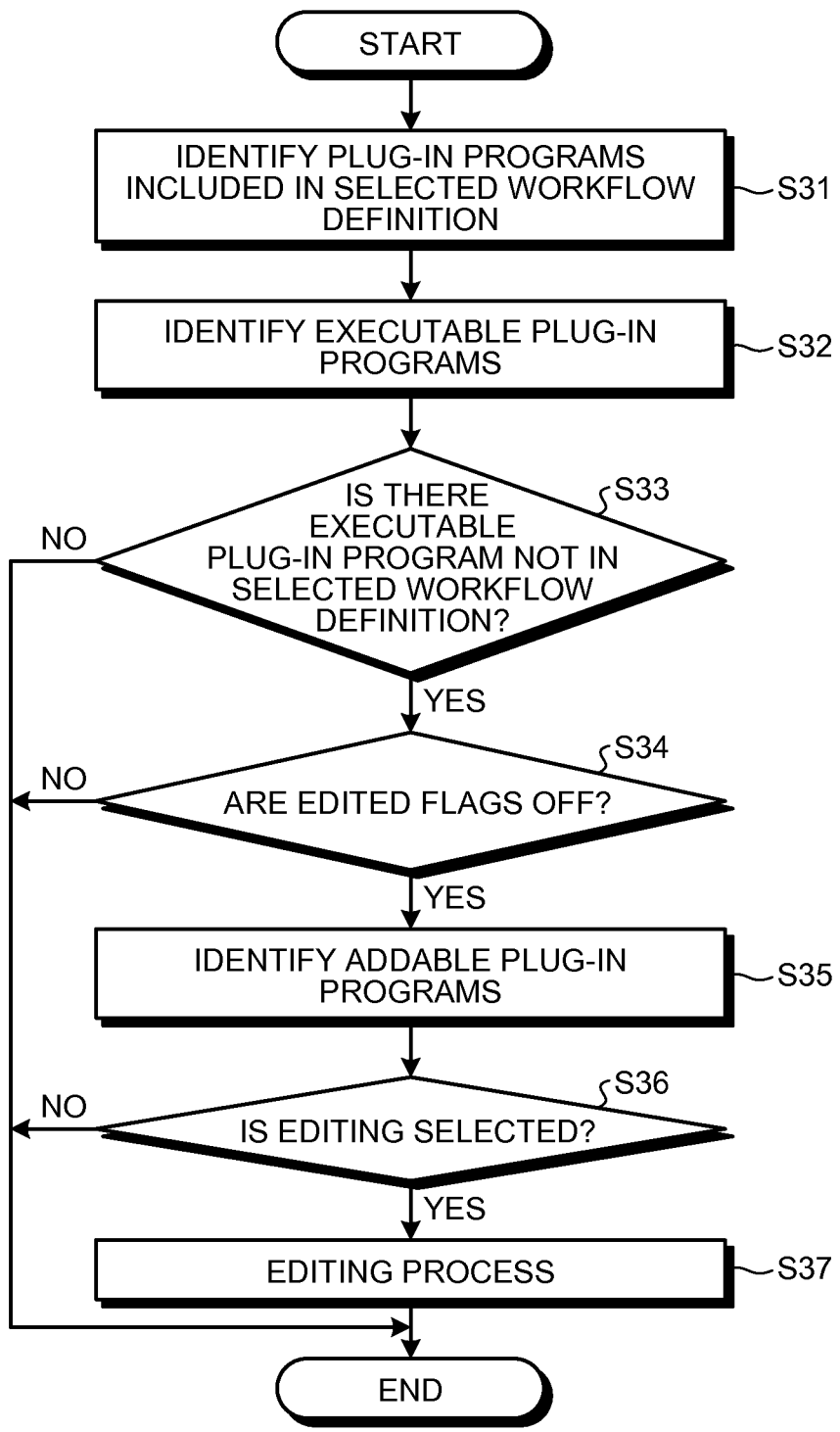
FIG. 10 is a flowchart illustrating the sequence of an editing process of a workflow definition in a second example.

FIG. 10 is a flowchart illustrating the sequence of an editing process of a workflow definition in a second example. The editing unit 75 of the delivery server 30 may execute, at Step S13 in FIG. 5, the editing process illustrated in FIG. 10, for example.

First, at Step S31 to Step S33, the editing unit 75 executes the same processes as those executed at Step S21 to Step S23 illustrated in FIG. 6. At Step S33, if there is any executable plug-in program that is not defined in the selected workflow definition (Yes at Step S33), the process of the editing unit 75 proceeds to Step S34.

At Step S34, the editing unit 75 determines whether there is any plug-in program that has been added or updated after the last edition of any of the workflow definitions by the administrator terminal 50 and is not included in the selected workflow definition.

Figures 11, 12:
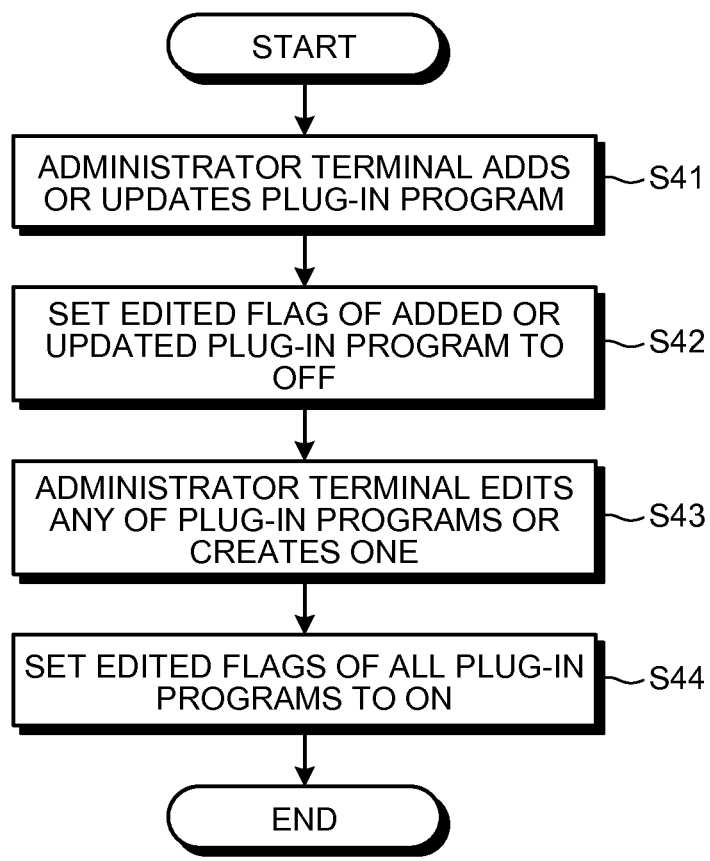
FIG. 11 is a table illustrating an example of edited flags used in the editing process in the second example in FIG. 10.
FIG. 12 is a flowchart illustrating the sequence of an updating process of the edited flags in FIG. 11.

The editing unit 75 determines whether an edited flag, which is assigned to each plug-in program as illustrated in FIG. 11, is off (e.g., 0) for each of the plug-in programs that are not included in the selected workflow definition, as one example. The edited flag is set to off (e.g., 0) when the plug-in program thereof is added or updated, and is set to on (e.g., 1) when the administrator terminal 50 edits any of the workflow definitions.

If any added or updated plug-in program is not present, more specifically, any plug-in program with the edited flag being off is not present in the selected workflow definition (No at Step S34), the editing unit 75 breaks away from the present sequence and ends the process without editing the selected workflow definition.

If the added or updated plug-in program is present, more specifically, a plug-in program with the edited flag being off are present (Yes at Step S34), the process of the editing unit 75 proceeds to Step S35.

At Step S35, the editing unit 75 identifies, as an addable plug-in program, the plug-in program that is not defined in the selected workflow definition and has been added or updated after the last edition of any of the workflow definitions by the administrator terminal 50.

Next, at Step S36 and Step S37, the editing unit 75 executes the same processes as those executed at Step S25 and Step S26 illustrated in FIG. 6.

Consequently, on the operation panel 61 of the scanning device 20, the editing unit 75 can add the plug-in program that has been added or updated after the last edition of any of the workflow definitions by the administrator terminal 50 to the selected workflow definition.

FIG. 12 is a flowchart illustrating the sequence of an updating process of the edited flags in FIG. 11. First, at Step S41, the administrator terminal 50 adds or updates any of the plug-in programs to be executed by the program executing unit 72. The plug-in programs are not necessarily be added or updated by the administrator terminal 50, and there are other ways including the delivery server 30 being made to read and install a CD-ROM in which the plug-in programs are stored, for example. Then, at Step S42, the editing unit 75 registers the edited flag assigned to the plug-in program added or updated by the administrator terminal 50 to be off.

Next, at Step S43, the administrator terminal 50 edits any of the workflow definitions out of the workflow definitions stored in the workflow storage unit 73 or creates a new workflow definition. Then, at Step S44, the editing unit 75 registers the edited flags assigned to all of the plug-in programs to be on.

This enables the editing unit 75, when any of the workflow definitions is not yet edited by the administrator after the plug-in program has been added or updated, to let the user of the scanning device 20 add the added or updated plug-in program to a workflow definition.

Figures 13, 14:
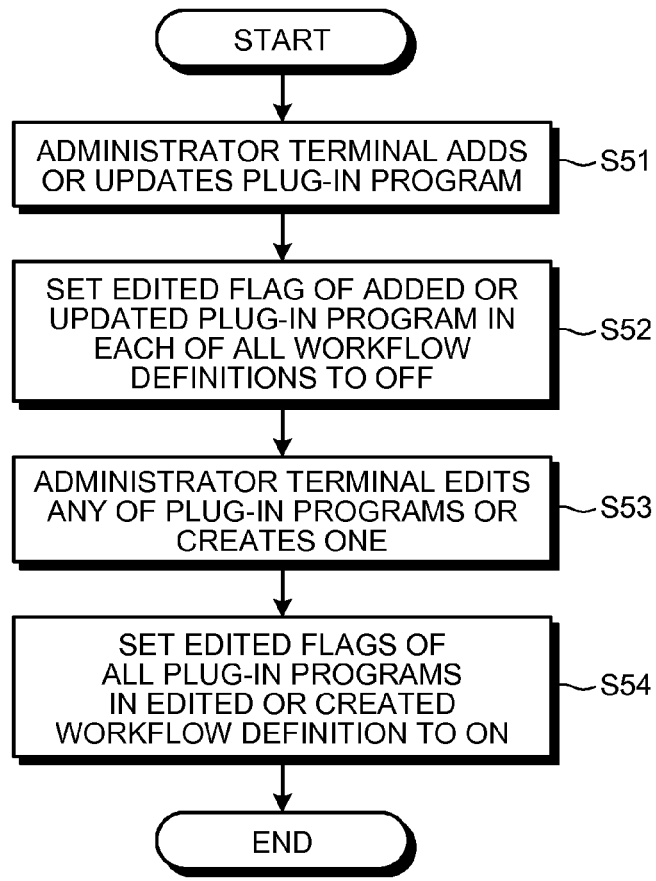
FIG. 13 is a table illustrating an example of edited flags assigned to each workflow definition and each plug-in program.
FIG. 14 is a flowchart illustrating the sequence of an updating process of the edited flags in FIG. 13.

FIG. 13 is a table illustrating an example of edited flags assigned to each workflow definition and each plug-in program. The editing unit 75 may manage the edited flags for each of the workflow definitions and for each of the plug-in programs as illustrated in FIG. 13.

In this case, at Step S34 in FIG. 10, the editing unit 75 determines whether there is any plug-in program that has been added or updated after the last edition of the selected workflow definition by the administrator terminal 50 and is not defined in the selected workflow definition. More specifically, the editing unit 75 determines whether the edited flag for the selected workflow definition is off for each of the plug-in programs that are not included in the selected workflow definition.

This enables the editing unit 75 to add, on the operation panel 61 of the scanning device 20, the plug-in program that has been added or updated after the last edition of the selected workflow definition by the administrator terminal 50, to the selected workflow definition.

FIG. 14 is a flowchart illustrating the sequence of an updating process of the edited flags in FIG. 13. First, at Step S51, the administrator terminal 50 adds or updates any of the plug-in programs to be executed by the program executing unit 72. Then, at Step S52, the editing unit 75 registers the edited flags assigned to the plug-in program added or updated by the administrator terminal 50 in all of the workflow definitions to be off.

Next, at Step S53, the administrator terminal 50 edits any of the workflow definitions out of the workflow definitions stored in the workflow storage unit 73 or creates a new workflow definition. Then, at Step S54, the editing unit 75 registers the edited flags assigned to all of the plug-in programs in the edited or created workflow definition to be on.

This enables the editing unit 75, when the selected workflow definition is not yet edited by the administrator after the plug-in program has been added or updated, to allow the user of the scanning device 20 to add the added or updated plug-in programs to the workflow definition.

The delivery server 30 in the above-described embodiment lets the user edit a workflow definition that defines the execution sequence of processes performed on the image data captured by the scanning device 20 at the time the scanning device 20 is used, thereby permitting the administrator to efficiently manage the workflow definitions.

In FIG. 10, the processes at Step S31 and Step S33 may be omitted. In other words, the processes at steps subsequent to Step S34 may be performed on the executable plug-in programs including the plug-in programs included in the selected workflow definition. This means that, when a plug-in program defined in a workflow definition is subsequently updated (version upgraded) and executable processes are expanded (for example, a new process is available to be selected), the workflow definition defined based on the plug-in program before the update can be edited based on the plug-in program after the update.

In the sequence in FIG. 10, the determination method of determining whether any executable plug-in program that is not defined in the selected workflow definition is one example.

As for the registration of the edited flags (switching from off to on) of the plug-in programs, it is not limited to the way in which the administrator terminal 50 accessing the delivery server 30 and editing any of the workflow definitions already defined is regarded as a trigger. For example, a new workflow definition being set may be regarded as a trigger. Furthermore, in editing a workflow definition, a process to be executed by a new plug-in program being added to the workflow defined may be regarded as a trigger, or even if a new plug-in program is not added, a workflow definition being edited may be regarded as a trigger, or even if a workflow definition is not changed, at least the administrator terminal 50 accessing the delivery server 30 and requesting the display of a workflow setting screen may be regarded as a trigger. This is because when the administrator accesses the delivery server 30 from the administrator terminal 50 to perform the setting of workflow definitions, the administrator can identify the presence of a new plug-in program (a plug-in program with the edited flag being off) on the setting screen, and thus it can be interpreted that the administrator examined the workflow definitions after identifying the presence of the new plug-in program even if he/she did not define the new plug-in program in any of the workflows at that time. Consequently, the administrator only needs to set what kind of operation is regarded as a trigger, and perform the registration of edited flags according to the setting.

The invention can be applied but not limited to the workflow by the network coordination of the scanning device 20 and the delivery server 30 in the foregoing. The device that requests or edits and requests a workflow is not necessarily be the scanning device 20, and the device (a requestor device) only needs to be capable of accessing the delivery server 30 and using the workflow executed in the delivery server 30 (capable of requesting execution of a workflow) and may be a PC, a projector, a whiteboard, an electronic blackboard, a handheld terminal, and a tablet device, for example. Furthermore, while the delivery server 30 is a device that executes a workflow including a delivery process, the delivery server 30 may not need to include the delivery process. The delivery server 30 may only need to be a device that executes at least a workflow, to which a computer program to execute a process that can be incorporated in a workflow is addable, and that causes a workflow by a process that uses the program to be defined. Thus, the delivery server 30 is not necessarily be a server and can be implemented by an information processing apparatus such as a PC.

The delivery server 30 in the embodiment includes a control device such as a CPU, a storage device such as a read only memory (ROM) and a random access memory (RAM), an external storage device such as an HDD and a CD drive device, a display device such as a display, and an input device such as a keyboard and a mouse, and is hardware configured using an ordinary computer.

The program executed by the delivery server 30 in the embodiment is recorded and provided in a computer readable recording medium such as a compact disc read only memory (CD-ROM), a flexible disk (FD), a compact disc recordable (CD-R), and a digital versatile disc (DVD), as an installable or executable file.

The program executed by the delivery server 30 in the embodiment may be stored in a computer connected to a network such as the Internet and provided being downloaded via the network. Furthermore, the program executed by the delivery server 30 in the embodiment may be provided or distributed via a network such as the Internet.

The program executed by the delivery server 30 in the embodiment may be embedded and provided in a ROM, for example.

The program executed by the delivery server 30 in the embodiment is modularly configured to include the above-described various units (the communication unit 71, the program executing unit 72, the workflow storage unit 73, the selecting unit 74, the editing unit 75, the setting unit 76, the selection information storage unit 77, the post-edit workflow storage unit 78, the setting information storage unit 79, and the workflow controller 80), and as the actual hardware, the CPU (a processor) reads out the program from the storage medium and executes it to load the various units on a main memory device, and thus the various units (the communication unit 71, the program executing unit 72, the workflow storage unit 73, the selecting unit 74, the editing unit 75, the setting unit 76, the selection information storage unit 77, the post-edit workflow storage unit 78, the setting information storage unit 79, and the workflow controller 80) are generated on the main memory device. Furthermore, a part or the whole of the respective various units (the communication unit 71, the program executing unit 72, the workflow storage unit 73, the selecting unit 74, the editing unit 75, the setting unit 76, the selection information storage unit 77, the post-edit workflow storage unit 78, the setting information storage unit 79, and the workflow controller 80) may be implemented by hardware.

The present invention enables efficient management of a workflow definition in which an execution sequence of processes is defined.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a memory having computer readable instructions and storing one or more programs; and
   at least one processor configured to execute the computer readable instructions to
   store definition data of one or more workflows in the memory, the definition data defining each of the one or more workflows including an execution sequence of one or more processes each executed by any of the one or more programs,
   display to a user a selection screen to select a workflow to be executed from among the one or more workflows stored in the memory,
   receive a selection of the workflow to be executed via the selection screen,
   determine whether there is a program, from among the stored one or more programs, that is not included in the selected workflow and permitted to add to the selected workflow by the user based on the stored one or more programs and one or more programs of executing the selected workflow,
   display to the user an edit screen to edit the selected workflow, the user being able to designate one of the one or more programs and change the execution sequence of the selected workflow by adding the one or more processes executed by the designated program to the execution sequence via the edit screen, and
   execute, in response to reception of an execution request for the selected workflow by the user having selected the workflow via the selection screen, the edited workflow when the selected workflow is edited via the edit screen, while executing the selected workflow not being edited when the selected workflow is not edited via the edit screen.

2. The information processing apparatus according to claim 1, wherein the at least one processor is further configured to:
   perform communication with a requestor device operated by the user via a network; and wherein
   the displaying the selection screen and the edit screen includes causing the requestor device to display the selection screen and the edit screen on a display of the requestor device.

3. The information processing apparatus according to claim 1, wherein the displaying the edit screen includes displaying the edit screen that restricts editing of the process having been defined by the selected workflow by restricting the deleting of the process defined by the selected workflow.

4. The information processing apparatus according to claim 1, wherein
   the at least one processor is further configured to
      set a first edit status, when one of the one or more programs have been updated or newly added to the information processing apparatus, to the updated or newly added program,
      change from the first edit status of the stored program to a second edit status when an administrator edits the definition data of the workflow, and
      determine whether at least one of the one or more programs of which the edit status is the first edit status is stored or not,
   the storing includes storing definition data edited by the administrator terminal in the memory, and
   the displaying includes displaying the edit screen that allows editing of the selected workflow when it is determined that the at least one of the one or more programs of which the edit status is the first edit status is stored in the information processing apparatus.

5. The information processing apparatus according to claim 1, wherein
   the displaying the selection screen includes displaying the selection screen of selecting the workflow to be executed from among the one or more workflows and an empty workflow, and
   the displaying the edit screen includes displaying the edit screen that allows creating a new workflow when the selection of the empty workflow is received at the receiving, the user being able to define the new workflow including an execution sequence of one or more processes executed by any of the one or more programs.

6. An information processing method comprising:
   storing, in memory, one or more programs;

storing, in memory, definition data of one or more workflows in the memory, the definition data defining each of the one or more workflows including an execution sequence of one or more processes each executed by any of the one or more programs;

displaying, using at least one processor, to a user a selection screen to select a workflow to be executed from among the one or more workflows stored in the memory;

receiving, using the at least one processor, a selection of the workflow to be executed via the selection screen;

determining, using the at least one processor, whether there is a program, from among the stored one or more programs, that is not included in the selected workflow and permitted to add to the selected workflow by the user based on the stored one or more programs and one or more programs of executing the selected workflow;

displaying, using the at least one processor, to the user an edit screen to edit the selected workflow, the user being able to designate one of the one or more programs and change the execution sequence of the selected workflow by adding the one or more processes executed by the designated program to the execution sequence via the edit screen; and executing, using the at least one processor, in response to reception of an execution request for the selected workflow by the user having selected the workflow via the selection screen, the edited workflow when the selected workflow is edited via the edit screen, while executing the selected workflow not being edited when the selected workflow is not edited via the edit screen.

7. The information processing method according to claim 6, further comprising:

performing, using the at least one processor, communication with a requestor device operated by the user via a network; and wherein the displaying the selection screen and the edit screen includes causing the requestor device to display the selection screen and the edit screen on a display of the requestor device.

8. The information processing method according to claim 6, wherein the displaying the edit screen includes displaying the edit screen that restricts editing of the process having been defined by the selected workflow by restricting the deleting of the process defined by the selected workflow.

9. The information processing method according to claim 6, further comprising:

setting a first edit status, when one of the one or more programs have been updated or newly added to the information processing apparatus, to the updated or newly added program, changing from the first edit status of the stored program to a second edit status when an administrator edits the definition data of the workflow, and determining, using the at least one processor, whether at least one of the one or more programs of which the edit status is the first edit status is stored or not; and wherein the storing includes storing definition data edited by the administrator terminal in the memory; and the displaying includes displaying the edit screen that allows editing of the selected workflow when it is determined that the at least one of the one or more programs of which the edit status is the first edit status is stored in the information processing apparatus.

10. The information processing method according to claim 6, wherein the displaying the selection screen includes displaying the selection screen of selecting the workflow to be executed from among the one or more workflows and an empty workflow, and the displaying the edit screen includes displaying the edit screen that allows creating a new workflow when the selection of the empty workflow is received at the receiving, the user being able to define the new workflow including an execution sequence of one or more processes executed by any of the one or more programs.

11. A non-transitory computer readable medium comprising computer readable instructions, when executed by at least one processor, causes the at least one processor to:

store, in memory, one or more programs;

store definition data of one or more workflows in the memory, the definition data defining each of the one or more workflows including an execution sequence of one or more processes each executed by any of the one or more programs;

display to a user a selection screen to select a workflow to be executed from among the one or more workflows stored in the memory;

receive a selection of the workflow to be executed via the selection screen;

determine whether there is a program, from among the stored one or more programs, that is not included in the selected workflow and permitted to add to the selected workflow by the user based on the stored one or more programs and one or more programs of executing the selected workflow;

displaying to the user an edit screen to edit the selected workflow, the user being able to designate one of the one or more programs and change the execution sequence of the selected workflow by adding the one or more processes executed by the designated program to the execution sequence via the edit screen; and execute, in response to reception of an execution request for the selected workflow by the user having selected the workflow via the selection screen, the edited workflow when the selected workflow is edited via the edit screen, while executing the selected workflow not being edited when the selected workflow is not edited via the edit screen.

12. The non-transitory computer readable medium according to claim 11, wherein the computer readable instructions, when executed by the at least one processor, further causes the at least one processor to:

perform communication with a requestor device operated by the user via a network; and wherein the displaying the selection screen and the edit screen includes causing the requestor device to display the selection screen and the edit screen on a display of the requestor device.

13. The non-transitory computer readable medium according to claim 11, wherein the computer readable instructions, when executed by the at least one processor, further causes the at least one processor to:

determine whether there is a process that is not included in the selected workflow but is executable by any of the one or more programs, and wherein the displaying the edit screen includes displaying the edit screen which is selectable by the determined process, the user being able to designate the program executing the determined process and add the determined process to the selected workflow.

14. The non-transitory computer readable medium according to claim 13, wherein the displaying the edit screen includes displaying the edit screen that restricts editing of the process having been defined by the selected workflow by restricting the deleting of the process defined by the selected workflow.

15. The non-transitory computer readable medium according to claim 11, wherein
the computer readable instructions, when executed by the at least one processor, further causes the at least one processor to
set a first edit status, when one of the one or more programs have been updated or newly added to the information processing apparatus, to the updated or newly added program,
change from the first edit status of the stored program to a second edit status when an administrator edits the definition data of the workflow, and
determine whether at least one of the one or more programs of which the edit status is the first edit status is stored or not,
the storing includes storing definition data edited by the administrator terminal in the memory, and
the displaying includes displaying the edit screen that allows editing of the selected workflow when it is determined that the at least one of the one or more programs of which the edit status is the first edit status is stored in the information processing apparatus.

16. The non-transitory computer readable medium according to claim 11, wherein
the displaying the selection screen includes displaying the selection screen of selecting the workflow to be executed from among the one or more workflows and an empty workflow, and
the displaying the edit screen includes displaying the edit screen that allows creating a new workflow when the selection of the empty workflow is received at the receiving, the user being able to define the new workflow including an execution sequence of one or more processes executed by any of the one or more programs.

* * * * *